United States Patent
Okabe et al.

(10) Patent No.: US 7,510,884 B2
(45) Date of Patent: Mar. 31, 2009

(54) SEMICONDUCTOR PRODUCTION SYSTEM AND SEMICONDUCTOR PRODUCTION PROCESS

(75) Inventors: Tsuneyuki Okabe, Tokyo-To (JP); Kengo Kaneko, Tokyo-To (JP)

(73) Assignee: Tokyo Electron Limited, Tokyo (JP)

( * ) Notice: Subject to any disclaimer, the term of this patent is extended or adjusted under 35 U.S.C. 154(b) by 555 days.

(21) Appl. No.: 10/564,558

(22) PCT Filed: Jul. 14, 2004

(86) PCT No.: PCT/JP2004/010033

§ 371 (c)(1), (2), (4) Date: Jan. 13, 2006

(87) PCT Pub. No.: WO2005/008350

PCT Pub. Date: Jan. 27, 2005

(65) Prior Publication Data

US 2006/0172442 A1    Aug. 3, 2006

(30) Foreign Application Priority Data

Jul. 16, 2003  (JP) .............................. 2003-197936

(51) Int. Cl.
*H01L 21/00* (2006.01)
(52) U.S. Cl. .............................. 438/11; 73/861; 438/5; 438/10
(58) Field of Classification Search .................. 73/861; 438/5, 10, 11
See application file for complete search history.

(56) References Cited

U.S. PATENT DOCUMENTS 4,335,605 A    6/1982  Boyd
4,581,707 A *  4/1986  Millar ......................... 702/47

(Continued)

FOREIGN PATENT DOCUMENTS

JP    05-289751    11/1993

(Continued)

OTHER PUBLICATIONS

Notification of Transmittal of Copies of Translation of the International Preliminary Report on Patentability (Form PCT/IB/338)—PCT/JP2004/010033, dated Jan. 2004.

(Continued)

*Primary Examiner*—Thanh V Pham
*Assistant Examiner*—Caleb Henry
(74) *Attorney, Agent, or Firm*—Smith, Gambrell & Russell, LLP

(57) ABSTRACT

A semiconductor manufacturing apparatus according to the present invention comprises: a treating unit that treats a substrate to manufacture thereon a semiconductor device; a fluid supplying channel for supplying a fluid required for a treatment of the substrate to the treating unit; a set voltage outputting unit that outputs a set voltage corresponding to a set flow volume of the fluid; a massflow controller disposed on the fluid supplying channel, that controls a flow volume of the fluid based on the set voltage; a first shut-off valve disposed on the fluid supplying channel on an upstream side of the massflow controller; and a second shut-off valve disposed on the fluid supplying channel on a downstream side of the massflow controller. The massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal. A storing unit is provided, that stores the detected voltage outputted from the detecting unit of the massflow controller, when the first and the second shut-off valves are closed. A set voltage correcting unit is provided, that corrects the set voltage based on the detected voltage stored in the storing unit, in such a manner that a drift of the detected voltage is compensated when an actual flow volume of the fluid is zero.

18 Claims, 8 Drawing Sheets

U.S. PATENT DOCUMENTS

| | | |
|---|---|---|
| 5,062,446 A | 11/1991 | Anderson |
| 5,394,755 A * | 3/1995 | Sudo et al. .................... 73/861 |
| 6,125,869 A * | 10/2000 | Horiuchi ........................ 137/1 |
| 6,185,469 B1 | 2/2001 | Lewis et al. |
| 6,339,727 B1 | 1/2002 | Ladd |
| 6,363,976 B1 | 4/2002 | Aoki et al. |
| 6,471,037 B1 | 10/2002 | Matsumoto |

FOREIGN PATENT DOCUMENTS

| | | |
|---|---|---|
| JP | 07-263350 | 10/1995 |
| JP | 07-281760 | 10/1995 |
| JP | 09-016268 | 1/1997 |
| JP | 09-184600 | 7/1997 |
| JP | 2000-122725 | 4/2000 |
| JP | 2001-197936 | 7/2000 |
| WO | WO 93/25950 | 12/1993 |

OTHER PUBLICATIONS

PCT International Preliminary Report on Patentability (Form PCT/IB/373)—PCT/JP2004/010033, dated Jan. 2004.

Translation of PCT Written Opinion of the International Searching Authority—(Form PCT/ISA/237)—PCT/JP2004/010033, dated Jan. 2004.

Notice of Allowance and Search Report issued from Taiwanese Patent Office on Sep. 12, 2008.

* cited by examiner

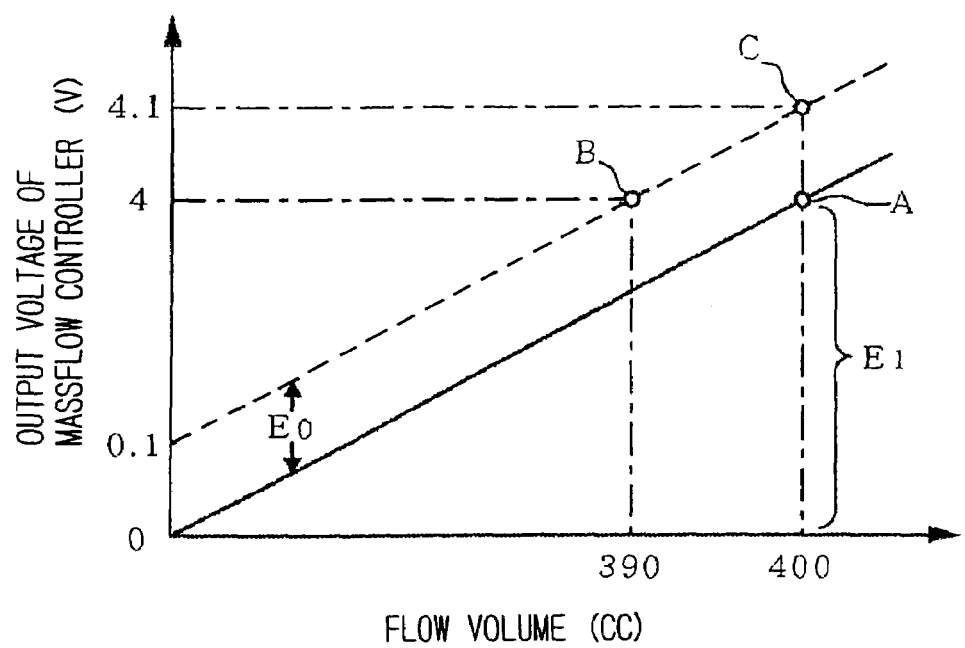
F I G. 5

SEMICONDUCTOR PRODUCTION SYSTEM AND SEMICONDUCTOR PRODUCTION PROCESS

BACKGROUND OF THE INVENTION

1. Field of the Invention

The present invention relates to a semiconductor manufacturing apparatus that performs a treatment for a substrate, such as a semiconductor wafer, with the use of a fluid of which flow volume is adjusted by a massflow controller.

2. Background Art

A semiconductor manufacturing process conventionally includes a step in which a substrate is treated with a predetermined gas or liquid. As a treatment step with a gas, there are, for example, a film deposition step with a film deposition gas, an oxidation step with an oxidation gas, and an etching step with an etching gas. As a treatment step with a liquid, there are., for example, a step of supplying a resist liquid to a substrate, and a step of applying on a substrate a chemical liquid containing a precursor of an insulation film.

Recently, in order to cope with a finer pattern of a semiconductor device, a thinner film thickness is required. Thus, a flow volume of a gas or liquid to be supplied should be accurately controlled, and a massflow controller is used therefor.

In a massflow controller, a fluid flowing through a narrow tube draws a heat from a heating resistance wire according to a flow volume of the fluid. That is, the massflow controller detects a flow volume of the fluid, on the basis of a change in a resistance value of the heating resistance wire depending on a flow volume of the fluid. The massflow controller includes: a flow volume detecting unit; a comparing unit that compares an output voltage (detected voltage corresponding to a flow volume) outputted from the flow volume detecting unit, with a set voltage which is set based on a set flow volume; and a flow volume adjusting valve that is operated based on a comparison output which is outputted from the comparing unit.

However, while the massflow controller is used, it sometimes occurs that an actual flow volume deviates from the set flow volume. For example, even if an actual flow volume is zero, there may be a case in which a voltage value outputted from the flow volume detecting unit is not zero, which is an error.

In addition to the zero point shift, the deviation of an actual flow volume from a set flow volume is caused by a shift of a change ratio (inclination), i.e., span, of an output voltage relative to a flow volume. One of the factors of the span shift is as follows. In a heating resistance wire on an upstream side and a heating resistance wire on a downstream side, both serving as sensors included in a bridge circuit, a temperature change amount relative to a change in flow volume, i.e., a change amount of an output voltage relative thereto is shifted from an initially calibrated one. This may be caused by, for example, a difference between an environmental temperature at the time of shipment by a manufacturer and an environmental temperature on a user's side; deterioration with elapse of the time of a coating material of a coil-like heating resistance wire (sensor); separation of a coating material from a heating resistance wire; slack of a coil of a heating resistance wire; malfunction of a circuit part; variation of a power supply voltage; and pollution (caused by corrosion or adhesion of product) of a pipeline wrapped with a sensor. As for a flow volume capable of being set in a massflow controller, a treatment is more susceptible to a flow volume error ratio of a smaller flow volume than a flow volume error ratio of a larger flow volume, under a condition of the same drift amount. For example, a flow volume error of a smaller flow volume has a larger influence on a thickness of a film formed on a semiconductor wafer surface.

In view of the recent higher integration and thinner film of a semiconductor device, a tolerance of a thickness of a film formed on a semiconductor wafer surface when it is manufactured has become strict. In order to manufacture a semiconductor wafer while maintaining a film thickness thereof within a tolerance, an almost largest flow volume is selected from flow volumes capable of being set in a massflow controller. The use of such a large flow volume can restrain a flow volume error to a smaller degree. For example, in a plurality of steps, when a set flow volume of a fluid must be largely changed depending on each step, one or more massflow controller(s) of a larger flow volume capacity and one or more massflow controller(s) of a smaller flow volume capacity are arranged in parallel, so as to choose (switch) a suitable massflow controller depending on the set flow volume of the fluid.

However, the use of a plurality of massflow controllers is disadvantageous in terms of costs. In addition, when an output is drifted, that is, when a fluid flow volume is zero but an output voltage therefor is not zero, the drifted output may have an adverse effect on a treatment.

On the other hand, Japanese Patent Laid-Open Publication No. 263350/1995 (especially, section 0014 and FIG. 1) describes that a measuring device, which is separated from a massflow controller, is disposed on a gas flow channel. The massflow controller is adjusted by a calibrator, based on a result measured by the measuring device.

Japanese Patent Laid-Open Publication No. 289751/1993 (especially, 9th column, lines 3 to 9) describes that the manufacturer previously, gradually changes a value of the current leading to a sensor coil of a massflow controller in an initial calibration without causing a gas to flow, so as to take out, as an unbalanced voltage of a bridge circuit, a temperature difference between the values of the current leading to the coil. By comparing the unbalanced voltage with an unbalanced voltage during use, a zero point correction amount and a span correction amount are calculated.

Since the method disclosed in Japanese Patent Laid-Open Publication No. 263350/1995 needs an additional measuring device, the method is disadvantageous in terms of costs. Further, if the measuring device itself is broken, the massflow controller cannot be handled. Moreover, a calibration performed by a calibrator is actually carried out by an operator by manually adjusting a variable resistance value. Thus, adjustment of the massflow controller at frequent intervals is troublesome.

The method disclosed in Japanese Patent Laid-Open Publication No. 289751/1993, in which an unbalanced voltage is used for adjustment, has the following disadvantages. That is, a product line is established by using a massflow controller manufactured by a certain manufacturer, which is selected out of plural massflow controllers sold by various manufacturers. However, when the massflow controller is replaced with a massflow controller of another manufacturer, the new massflow controller cannot be adjusted. In addition, there is a need for a mechanism for supplying a current to a bridge circuit while gradually changing a value of the current, which disadvantageously complicates a constitution of an apparatus.

SUMMARY OF THE INVENTION

The present invention has been made in view of the foregoing disadvantages. One object of the present invention is to provide a semiconductor manufacturing apparatus and a semiconductor manufacturing method, in which a flow volume can be precisely set, without detaching a massflow controller from a pipe.

The present invention is a semiconductor manufacturing apparatus, comprising: a treating unit that treats a substrate to manufacture thereon a semiconductor device; a fluid supplying channel for supplying a fluid required for a treatment of the substrate to the treating unit; a set voltage outputting unit that outputs a set voltage corresponding to a set flow volume of the fluid; a massflow controller disposed on the fluid supplying channel, that controls a flow volume of the fluid based on the set voltage; a first shut-off valve disposed on the fluid supplying channel on an upstream side of the massflow controller; and a second shut-off valve disposed on the fluid supplying channel on a downstream side of the massflow controller; wherein the massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal; a storing unit is provided, that stores the detected voltage outputted from the detecting unit of the massflow controller, when the first and the second shut-off valves are closed; and a set voltage correcting unit is provided, that corrects the set voltage based on the detected voltage stored in the storing unit, in such a manner that a drift of the detected voltage is compensated when an actual flow volume of the fluid is zero.

According to the present invention, in order to compensate a drift of the detected voltage when a flow volume is zero, the massflow controller is not adjusted, but a set voltage is corrected. As a result, a flow volume characteristic of the massflow controller can be exactly controlled in a simple manner.

Preferably, the semiconductor manufacturing apparatus further comprises: a timing setting means that sets a timing at which the first and the second shut-off valves are closed, and the storing unit stores the detected voltage outputted from the detecting unit of the massflow controller.

Preferably, the semiconductor manufacturing apparatus further comprises: an alarm raising means that raises an alarm when the detected voltage deviates over a predetermined threshold value.

The present invention is a semiconductor manufacturing apparatus, comprising: a treating unit that treats a substrate under a predetermined vacuum atmosphere to manufacture a semiconductor device on the substrate; a vacuum discharging channel connected to the treating unit; a fluid supplying channel for supplying a fluid required for a treatment of the substrate to the treating unit; a set voltage outputting unit that outputs a set voltage corresponding to a set flow volume of the fluid; a massflow controller disposed on the fluid supplying channel, that controls a flow volume of the fluid based on the set voltage; a bypass channel that diverges from the fluid supplying channel and bypasses the treating unit to reach the vacuum discharging channel; a pressure detecting unit and a third shut-off valve that are disposed on the bypass channel in this order from an upstream side thereof; and a set voltage correcting unit that corrects the set voltage based on a comparison between: a pace of increase of detected pressure values detected by the pressure detecting unit for a predetermined period of time, the detected pressure values being detected when, at a predetermined timing, the bypass channel is vacuumed, the third shut-off valve is then closed, and the massflow controller is set at a predetermined flow volume to supply the fluid to the bypass channel through the fluid supplying channel; and a reference pace of increase of detected pressure values detected by the pressure detecting unit for a predetermined period of time, the detected pressure values being detected when the bypass channel is vacuumed, the third shut-off valve is then closed, and the massflow controller calibrated in a reference state is set at a predetermined flow volume to supply the fluid to the bypass channel through the fluid supplying channel.

According to the present invention, in order to compensate a change of a relationship between a set voltage and a flow volume, the massflow controller is not adjusted, but a set voltage is corrected. As a result, a flow volume characteristic of the massflow controller can be exactly controlled in a simple manner.

Preferably, in the semiconductor manufacturing apparatus, the massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal; and the set voltage correcting unit corrects the set voltage in such a manner that a span shift of the detected voltage is compensated.

Preferably, in the semiconductor manufacturing apparatus, the set voltage correcting unit corrects the set voltage based on a comparison between: a plurality of paces of increase obtained when the massflow controller is set at a plurality of predetermined flow volumes; and a plurality of reference paces of increase obtained when the massflow controller calibrated in a reference state is set at a plurality of predetermined flow volumes.

The present invention is A semiconductor manufacturing apparatus, comprising: a treating unit that treats a substrate under a predetermined vacuum atmosphere to manufacture a semiconductor device on the substrate; a vacuum discharging channel connected to the treating unit; a fluid supplying channel for supplying a fluid required for a treatment of the substrate to the treating unit; a set voltage outputting unit that outputs a set voltage corresponding to a set flow volume of the fluid; a massflow controller disposed on the fluid supplying channel, that controls a flow volume of the fluid based on the set voltage; a bypass channel that diverges from the fluid supplying channel and bypasses the treating unit to reach the vacuum discharging channel; a first shut-off valve disposed on the fluid supplying channel on an upstream side of the massflow controller; and a pressure detecting unit disposed on the bypass channel; and a set voltage correcting unit that corrects the set voltage based on a comparison between: a pace of decrease of detected pressure values detected by the pressure detecting unit for a predetermined period of time, the detected pressure values being detected when the first shut-off valve is closed under a condition wherein, at a predetermined timing, the massflow controller is set at a predetermined flow volume to supply the fluid to the bypass channel through the fluid supplying channel while the bypass channel is vacuumed; and a reference pace of decrease of detected pressure values detected by the pressure detecting unit for a predetermined period of time, the detected pressure values being detected when the first shut-off valve is closed under a condition wherein the massflow controller calibrated in a reference state is set at a predetermined flow volume to supply the fluid to the bypass channel through the fluid supplying channel while the bypass channel is vacuumed.

According to the present invention, in order to compensate a shift in a relationship between the set voltage and the flow volume, the massflow controller itself is not adjusted, but a set voltage is corrected. As a result, a flow volume characteristic of the massflow controller can be exactly controlled in a simple manner.

Preferably, in the semiconductor manufacturing apparatus, the massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal; and the set voltage correcting unit corrects the set voltage in such a manner that a span shift of the detected voltage is compensated.

Preferably, in the semiconductor manufacturing apparatus, the set voltage correcting unit corrects the set voltage based on a comparison between: a plurality of paces of decrease obtained when the massflow controller is set at a plurality of predetermined flow volumes; and a plurality of reference paces of decrease obtained when the massflow controller calibrated in a reference state is set at a plurality of predetermined flow volumes.

The present invention also provides a semiconductor manufacturing method.

That is, the present invention is a semiconductor manufacturing method performed by a semiconductor manufacturing apparatus including: a treating unit that treats a substrate to manufacture thereon a semiconductor device; a fluid supplying channel for supplying a fluid required for a treatment of the substrate to the treating unit; a set voltage outputting unit that outputs a set voltage corresponding to a set flow volume of the fluid; a massflow controller disposed on the fluid supplying channel, that controls a flow volume of the fluid based on the set voltage; a first shut-off valve disposed on the fluid supplying channel on an upstream side of the massflow controller; and a second shut-off valve disposed on the fluid supplying channel on a downstream side of the massflow controller; wherein the massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal; a storing unit is provided, that stores the detected voltage outputted from the detecting unit of the massflow controller, when the first and the second shut-off valves are closed; and a set voltage correcting unit is provided, that corrects the set voltage based on the detected voltage stored in the storing unit, in such a manner that a drift of the detected voltage is compensated when an actual flow volume of the fluid is zero; the semiconductor manufacturing method comprising the steps of: closing the first and the second shut-off valves; causing the storing unit to store the detected voltage outputted from the detecting unit of the massflow controller, when the first and the second shut-off valves are closed; and causing the set voltage correcting unit to correct the set voltage based on the detected voltage stored in the storing unit, in such a manner that a drift of the detected voltage is compensated when an actual flow volume of the fluid is zero.

Alternatively, the present invention is a semiconductor manufacturing method performed by a semiconductor manufacturing apparatus including: a treating unit that treats a substrate under a predetermined vacuum atmosphere to manufacture a semiconductor device on the substrate; a vacuum discharging channel connected to the treating unit; a fluid supplying channel for supplying a fluid required for a treatment of the substrate to the treating unit; a set voltage outputting unit that outputs a set voltage corresponding to a set flow volume of the fluid; a massflow controller disposed on the fluid supplying channel, that controls a flow volume of the fluid based on the set voltage; a bypass channel that diverges from the fluid supplying channel and bypasses the treating unit to reach the vacuum discharging channel; a pressure detecting unit and a third shut-off valve that are disposed on the bypass channel in this order from an upstream side thereof; and a set voltage correcting unit that corrects the set voltage based on a comparison between: a pace of increase of detected pressure values detected by the pressure detecting unit for a predetermined period of time, the detected pressure values being detected when, at a predetermined timing, the bypass channel is vacuumed, the third shut-off valve is then closed, and the massflow controller is set at a predetermined flow volume to supply the fluid to the bypass channel through the fluid supplying channel; and a reference pace of increase of detected pressure values detected by the pressure detecting unit for a predetermined period of time, the detected pressure values being detected when the bypass channel is vacuumed, the third shut-off valve is then closed, and the massflow controller calibrated in a reference state is set at a predetermined flow volume to supply the fluid to the bypass channel through the fluid supplying channel; the semiconductor manufacturing method comprising the steps of: calculating a reference pace of increase of detected pressure values detected by the pressure detecting unit for a predetermined period of time, when the bypass channel is vacuumed, the third shut-off valve is then closed, and the massflow controller calibrated in a reference state is set at a predetermined flow volume to supply the fluid to the bypass channel through the fluid supplying channel; calculating a pace of increase of detected pressure values detected by the pressure detecting unit for a predetermined period of time, when, at a predetermined timing, the bypass channel is vacuumed, the third shut-off valve is then closed, and the massflow controller is set at a predetermined flow volume to supply the fluid to the bypass channel through the fluid supplying channel; and correcting the set voltage based on the comparison between the reference pace of increase and the pace of increase.

Alternatively, the present invention is a semiconductor manufacturing method performed by a semiconductor manufacturing apparatus including: a treating unit that treats a substrate under a predetermined vacuum atmosphere to manufacture a semiconductor device on the substrate; a vacuum discharging channel connected to the treating unit; a fluid supplying channel for supplying a fluid required for a treatment of the substrate to the treating unit; a set voltage outputting unit that outputs a set voltage corresponding to a set flow volume of the fluid; a massflow controller disposed on the fluid supplying channel, that controls a flow volume of the fluid based on the set voltage; a bypass channel that diverges from the fluid supplying channel and bypasses the treating unit to reach the vacuum discharging channel; a first shut-off valve disposed on the fluid supplying channel on an upstream side of the massflow controller; and a pressure detecting unit disposed on the bypass channel; and a set voltage correcting unit that corrects the set voltage based on a comparison between: a pace of decrease of detected pressure values detected by the pressure detecting unit for a predetermined period of time, the detected pressure values being detected when the first shut-off valve is closed under a condition wherein, at a predetermined timing, the massflow controller is set at a predetermined flow volume to supply the fluid to the bypass channel through the fluid supplying channel while the bypass channel is vacuumed; and a reference pace of decrease of detected pressure values detected by the pressure detecting unit for a predetermined period of time, the detected pressure values being detected when the first shut-off valve is closed under a condition wherein the massflow controller calibrated in a reference state is set at a predetermined flow volume to supply the fluid to the bypass channel through the fluid supplying channel while the bypass channel is vacuumed; the semiconductor manufacturing method comprising the steps of: calculating a reference pace of decrease of detected pressure values detected by the pressure detecting unit for a predetermined period of time, when the first shut-off valve is closed under a condition wherein the massflow controller calibrated in a reference state is set at a predetermined flow volume to supply the fluid to the bypass channel through the fluid supplying channel while the bypass channel is vacuumed; calculating a pace of decrease of detected pressure values detected by the pressure detecting unit for a predetermined period of time, when the first shut-off valve is closed under a condition wherein, at a predetermined timing, the massflow controller is set at a predetermined flow volume to supply the fluid to the bypass channel through the fluid supplying channel while the bypass channel is vacuumed; and correcting the set voltage based on the comparison between the reference pace of decrease and the pace of decrease.

BRIEF DESCRIPTION OF THE DRAWINGS

FIG. 5 is a graph showing a relationship between set voltages and flow volumes of the massflow controller;

DETAILED DESCRIPTION OF THE INVENTION

Embodiments of the present invention are described below, with reference to the accompanying drawings.

Figure 1:
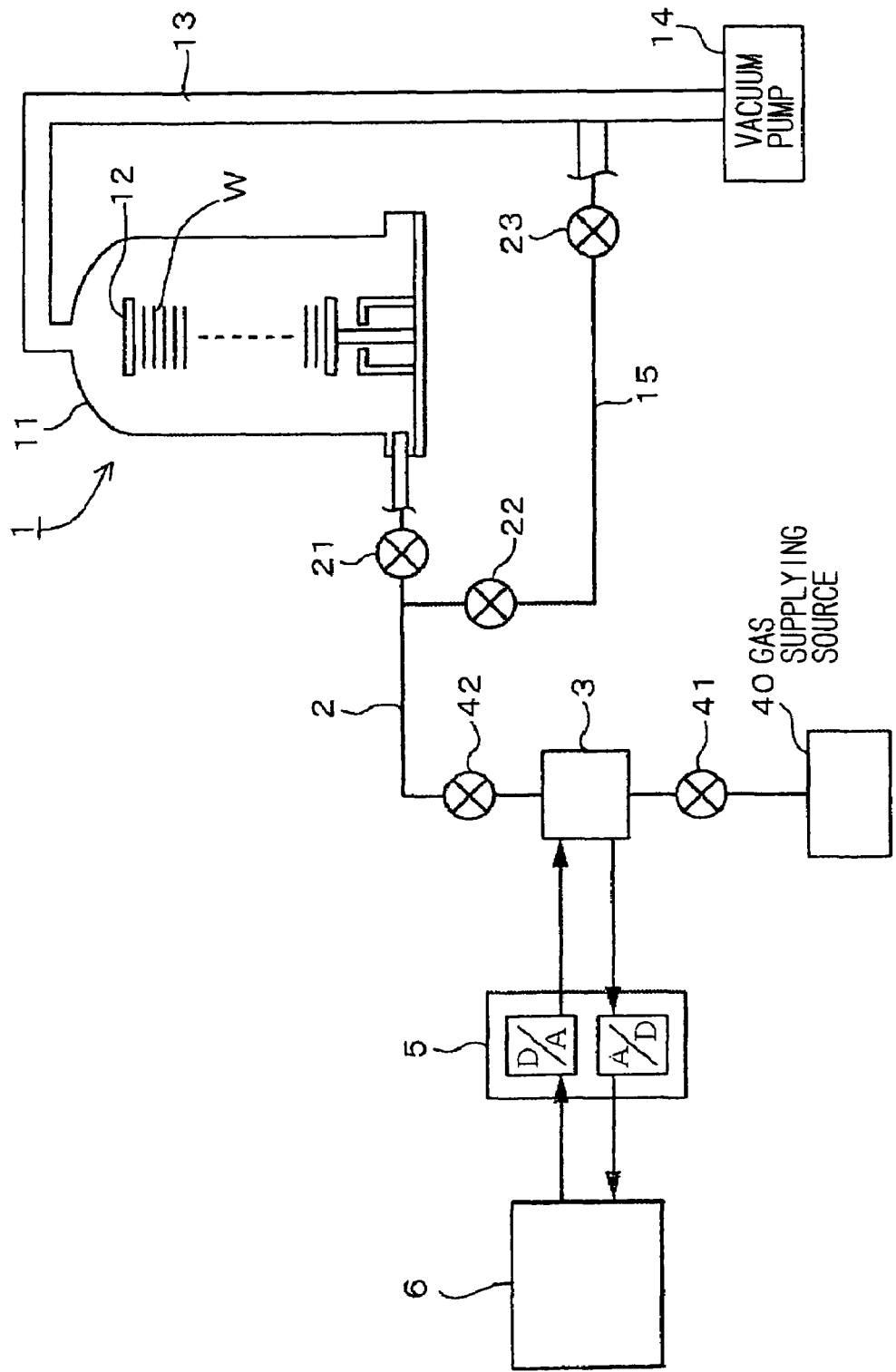
FIG. 1 is a block diagram showing a structure of a semiconductor manufacturing apparatus in one embodiment according to the present invention.

FIG. 1 is a block diagram schematically showing a structure of a semiconductor manufacturing apparatus in one embodiment according to the present invention. The semiconductor manufacturing apparatus includes a heat-treating unit 1 that performs a treatment for a substrate to manufacture thereon a semiconductor integrated circuit. A holder 12 holding a plurality of substrates such as wafers W is loaded into a vertical reaction tube 11 which is a reaction vessel (treatment vessel) of the heat-treating unit 1. The wafers W in the reaction tube 11 are heated by heating means, not shown, disposed outside the reaction tube 11. At the same time, a predetermined gas is introduced into the reaction tube 11 through a gas supplying channel 2 formed of, e.g., a gas supplying pipe. In this manner, a predetermined heat treatment is performed for the substrates. In FIG. 1, the reference number 13 depicts an exhaust pipe. The reference number 14 depicts a vacuum pump serving as vacuum-evacuating means. The reference number 15 depicts a bypass channel bypassing the reaction tube 11 to connect the gas supplying channel 2 and the exhaust pipe 13 to each other. The reference numbers 21, 22, and 23 respectively depict valves such as shut-off valves.

The gas supplying channel 2 is provided with a massflow controller 3 for adjusting a flow volume of a gas supplied by a gas supplying source 40. A shut-off valve 41 id disposed on an upstream side of the massflow controller 3, while a shut-off valve 42 is disposed on a downstream side of the massflow controller 3. By closing the shut-off valves 41 and 42, a flow of a fluid, i.e. a gas in this embodiment, passing through the massflow controller 3, can be shut off (it is possible to cause a flow volume of the gas to be zero).

Figure 2:
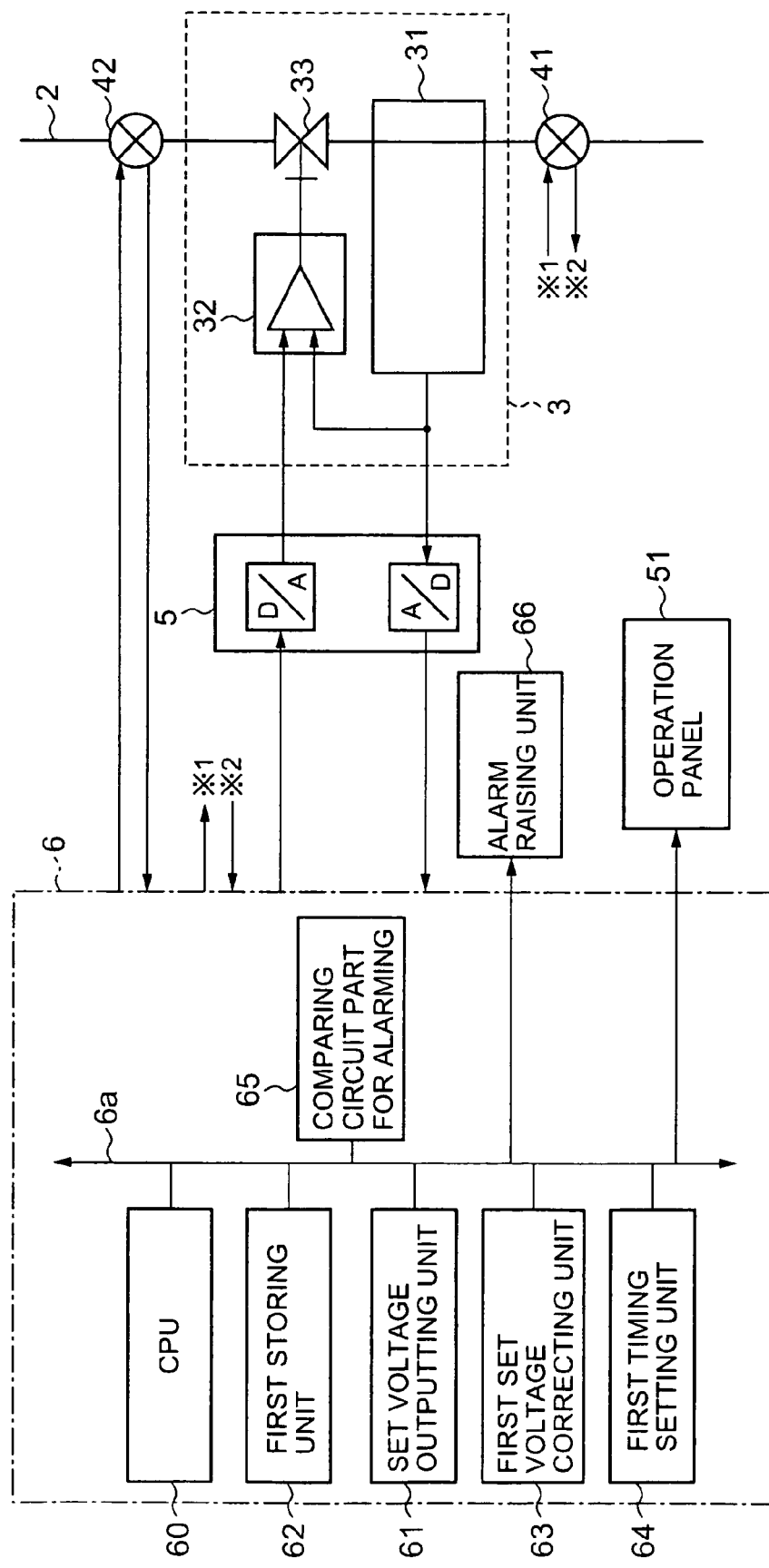
FIG. 2 is a block diagram showing a structure of a treating unit, and a relationship between the treating unit and a massflow controller.

As shown in FIG. 2, the massflow controller 3 includes: a flow volume detecting unit 31; a comparing unit (adjusting unit) 32; and a control valve (flow volume adjusting valve) 33 as a flow volume adjusting unit.

Figure 3:
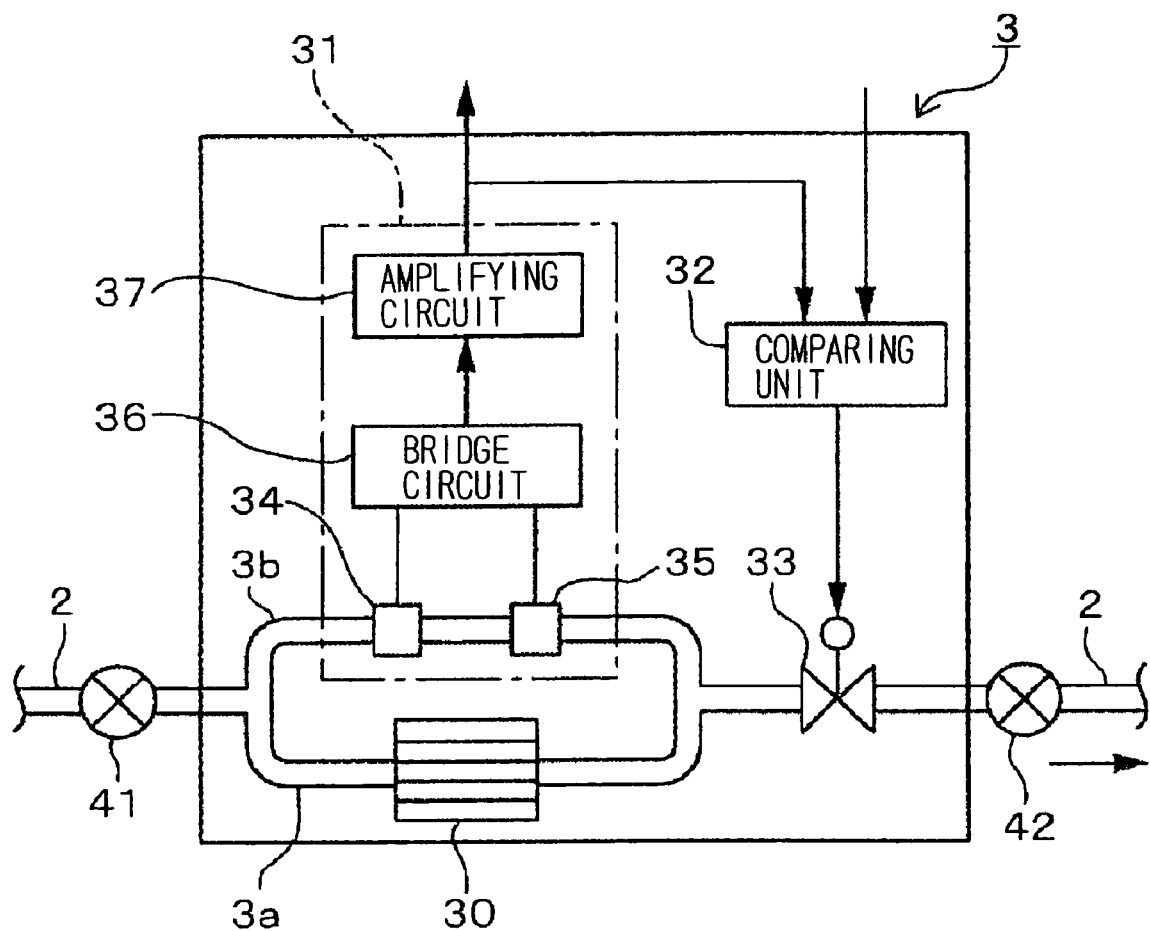
FIG. 3 is a block diagram showing a structure of the massflow controller.

A more detailed structure of the massflow controller 3 is described referring to FIG. 3. The gas supplying channel 2 introduced inside the massflow controller 3 diverges into a mainstream part 3a and a sub-stream part 3b. The sub-stream part 3b is provided with a flow volume sensor formed of two heating resistance wires 34 and 35 for measuring a flow volume of a fluid in the gas supplying channel 2. The mainstream part 3a is provided with a-bypass part 30 which equalizes conditions in the mainstream channel 3a, such as a flow volume, to those in the sub-stream channel 3b. That is, the bypass part 30 can adjust the features such as a flow volume, temperature, and pressure in the mainstream channel 3a to be equal to the features in the sub-stream channel 3b. Thus, a measurement error caused by the sensors 34 and 35 can be prevented.

A principle of detecting a flow volume is explained. When the fluid flows through the sub-stream part 3b, a temperature at the upstream-side sensor 34 is lowered because a heat is taken from the sensor 34, while a temperature at the downstream-side sensor 35 is raised because a heat is given to the sensor 35, so that the temperature detected by the sensor 34 differs from the temperature detected by the sensor 35. A flow volume of the fluid can be detected based on the temperature difference.

The massflow controller 3 is further provided with: a bridge circuit 36 that detects a difference between resistance values of the heating resistance wires 34 and 35 as a voltage signal; and an amplifying circuit 37 that amplifies the voltage signal. The heating resistance wires 34 and 35, the bridge circuit 36, and the amplifying circuit 37 constitute the flow volume detecting unit 31. The comparing unit 32 compares a set signal (set voltage) corresponding to a set flow volume, which is described below, with a voltage from the amplifying circuit 37. Based on the comparison result (deviation), the comparing unit 32 outputs an operation signal for adjusting an opening degree of the control valve 33.

A controller 6 is connected to the massflow controller 3 via a signal converting unit 5. The signal converting unit 5 is adapted to convert an analog signal from the massflow controller 3 to a digital signal, as well as to convert a digital signal from the controller 6 to an analog signal.

Referring to FIG. 2, a more detailed structure of the controller 6 is explained. A display part 51 formed of, e.g., a liquid crystal panel, is connected to the controller 6. The display part 51 also serves as an input device of a touch-panel type. The reference number 6a depicts a data bus, and the reference number 60 depicts a CPU that controls the apparatus. The reference number 61 depicts a set voltage outputting unit that outputs a set voltage corresponding to a set flow volume of the massflow controller 3. The set voltage outputting unit 61 is adapted to output a set voltage from 0V to 5V so as to set a flow volume of the massflow controller 3 from 0% to 100%. The reference number 62 depicts a first storing unit. The first storing unit 62 is adapted to store, as a drifted voltage, an output voltage (a voltage value detected from the flow volume detecting unit 31) which is outputted from the massflow controller 3 when the shut-off valves 41 and 42 are closed. The reference number 63 depicts a first set voltage correcting unit. The first set voltage correcting unit 63 is adapted to correct a set voltage when an output voltage outputted from the massflow controller 3 is different from a reference voltage (0V in this embodiment), that is, when a drifted voltage ±E0(V) is generated, while the shut-off valves 41 and 42 are closed. The reference number 64 depicts a first timing setting unit. The first timing setting unit 64 is adapted to set a timing at which the shut-off valves 41 and 42 are closed and the set voltage for the massflow controller 3 is reconsidered (corrected). The reference number 65 depicts a comparing circuit part for alarming. The comparing circuit part for alarming 65 is adapted to judge whether the drifted voltage is over a predetermined threshold value. When the drifted voltage is over the threshold value, the comparing circuit part for alarming 65 causes an alarm raising unit 66 to raise an alarm (an alarm signal, an alarm indication, and so on). In this embodiment, the threshold value is 0.3V (300 mV). When a drifted voltage over the threshold value is measured in the massflow controller 3, the massflow controller 3 is judged to be broken. Then, such a message is informed to an operator by means of an alarm outputted from the alarm raising unit 66 and an alarm indication displayed in the operation panel 51.

Figure 4:
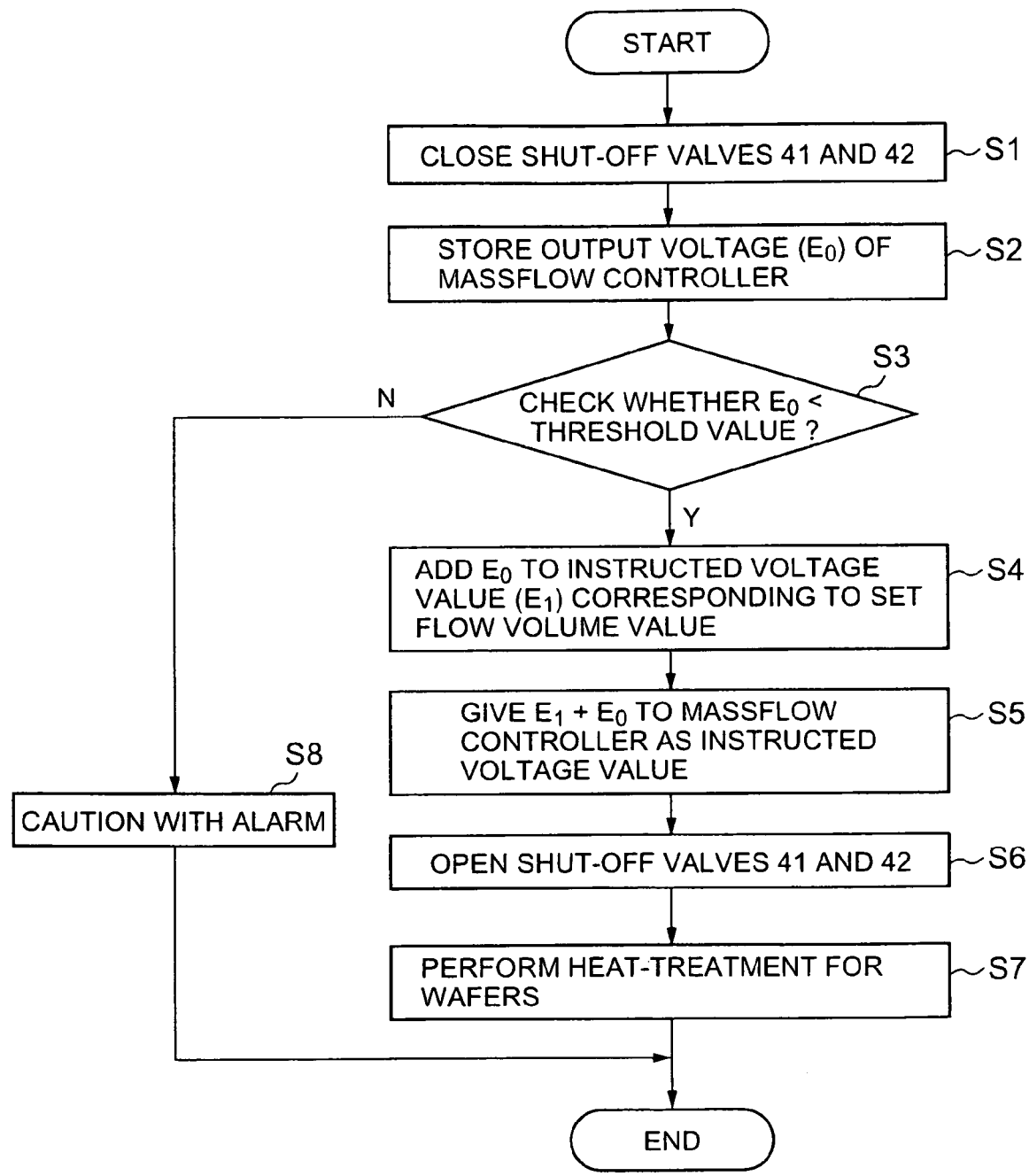
FIG. 4 is a flowchart showing a method of correcting a set voltage of the massflow controller in one embodiment according to the present invention.

An operation of the above embodiment is described, with reference to the flowchart of FIG. 4 and the graph of FIG. 5. The massflow controller 3 used in this embodiment is designed such that a flow volume and an output voltage are in a linear relationship, a maximum flow volume is 500 cc/min, and an output voltage corresponding to the maximum flow volume is 5V.

At first, when the massflow controller 3 is incorporated in the apparatus, an output voltage is set at zero under a condition wherein a flow volume is zero. In the condition, a predetermined heat treatment is performed for substrates such as wafers W in the heat-treating unit 1. That is, a set voltage corresponding to a set flow volume for a process to be executed is transmitted to the massflow controller 3 from the controller 6 through the signal processing unit 5. In the massflow controller 3, the control valve 33 (see, FIG. 2) is adjusted in such a manner that a treatment gas of the set flow volume is supplied to the reaction tube 11. For example, when the set flow volume is 400 cc/min, a voltage of 4V is given to the massflow controller 3. Just after an initial calibration of the massflow controller 3 (a reference state), the output voltage is zero when the flow volume is zero. Thus, the treatment gas of the set flow volume, i.e., 400 cc/min is supplied to the reaction tube 11.

Thereafter, in accordance with a timing which has been set by the timing setting unit 64, a condition of the massflow controller 3 is examined by the following steps, during a standby period before or after the heat treatment is carried out. First, by closing the shut-off valves 41 and 42, no gas is allowed to flow into the massflow controller 3. Then, the control valve 33 (see, FIG. 3) of the massflow controller 3 is opened, e.g., full-opened, by an instruction from the controller 6, for example. Thus, a flow of the gas in the vicinity of the sensors 34 and 35 are well balanced (step S1). At this time, an output voltage (E0) outputted from the massflow controller 3, i.e., an output voltage from the massflow controller 3 when the flow volume is zero, is stored in the first storing unit 62 (step S2). In this embodiment, the output voltage E0 is ±0.1V.

Next, it is judged whether the output voltage (E0) outputted from the massflow controller 3 is within the predetermined threshold value (step S3). If the threshold value is 300 mV, the output voltage E0 (+0.1V (100 mV)) is within the threshold value, and then a step S4 is carried out. Meanwhile, suppose that a flow volume of the massflow controller 3 is set at 400 cc/min through the operation panel 51. Under this condition, the first set voltage correcting unit 63 corrects the set voltage corresponding to the set flow volume in the following manner. That is, the output voltage (E0) 0.1V stored in the storing unit 62 is added to the set voltage 4V outputted from the set voltage outputting unit 61<4V+(+0.1V)=4.1V> to correct the set voltage, so that a corrected value 4.1V is obtained. The corrected value (4.1V) is given to the massflow controller 3 as an appropriate set voltage (voltage value to be instructed) (step S5).

FIG. 5 shows a relationship between set voltages and flow volumes of the massflow controller 3. A voltage—flow volume characteristic at an initial calibration is represented by the solid line. A set point is shown by the A point. A voltage—flow volume characteristic when a zero point of the massflow controller 3 is drifted to generate a drifted voltage of 0.1V (drift of the output voltage) is represented by the dashed line. At this moment, the set point is shifted to the B point. Under this state, the flow volume decreases to be 390 cc/min, which is not desired. Therefore, the set voltage is corrected as described above, so as to shift the set point from the B point to the C point, with the voltage—flow volume characteristic being unchanged. As a result, a flow volume set by the massflow controller 3 can be 400 cc as has been set.

Upon the completion of an adjustment of the set voltage of the massflow controller 3, the shut-off valves 41 and 42 are opened (step S6). Then, the wafers W are loaded into the reaction tube 11, and the valve 21 is opened to supply a gas of the set flow volume into the reaction tube 11, so that the wafers W are subjected to a predetermined heat treatment (step S7).

In the above embodiment, a case in which the zero point is shifted to a plus side is illustrated. However, when the zero point is shifted to a minus side, that is, when the output voltage E0 is −0.1V, the voltage −0.1V is added to the set voltage 4V outputted from the set voltage outputting unit 61<4V+(−0.1v)=3.9V> to correct the set voltage, so that a corrected value 3.9V is obtained. The corrected value (3.9V) is given to the massflow controller 3 as an appropriate set voltage (voltage value to be instructed).

In the step S3, when it is judged that the output voltage (E0) outputted from the massflow controller 3 is over the predetermined threshold value, the alarm raising unit 66 outputs an alarm, and the malfunction of the massflow controller 3 is noticed to an operator through the display panel 6 (step S8). In this case, the operator examines the massflow controller 3, or asks the manufacturer to repair the same.

In the above embodiment, the set voltage outputted from the controller 6 is corrected based on an output voltage outputted from the massflow controller 3, with the shut-off valves 41 and 42 respectively disposed on a upstream side and a downstream side of the massflow controller 3 being closed, in such a manner that a drift of the output voltage (drifted voltage) when the flow volume is zero is compensated. In other words, the massflow controller 3 is not adjusted, but the set signal is corrected. Therefore, it is not required for an operator to enter a maintenance room where the massflow controller 3 is installed so as to adjust the massflow controller 3. Further, it is unnecessary to suspend a product line.

A conventional method of adjusting a zero point of the massflow controller 3 carried out by an operator is described. Conventionally, the operator turns off a power source of the apparatus, and attaches a jig for a measuring tester on the massflow controller 3. Then, by turning on the power source of the apparatus, the operator inputs an instruction of a set flow volume being zero through an operation display panel. After the apparatus is left as it is for a few minutes, a voltage when the flow volume is zero is measured by the tester, and the voltage is adjusted in such a manner that it takes a value within a predetermined range. Thereafter, the power source of the apparatus is turned off, the jig is detached from the apparatus, the power source is again turned on, and then an actual condition is confirmed through the operation display panel.

In the above embodiment, the above complicated operations for adjustment by suspending the apparatus can be omitted, so that the apparatus can be more efficiently operated. Moreover, a personal risk can be decreased by avoiding an opening of a gas box containing gas supplying instruments, because it is often that a toxic gas is used in a semiconductor manufacturing apparatus. In addition, a periodic inspection of the massflow controller 3 can be saved, which may have an effect on a downtime of the apparatus.

In the above embodiment, a voltage outputted from the calibrated massflow controller 3 is zero, when no gas flows through the massflow controller 3. However, the present invention is effective even in a case wherein the output voltage is not zero when no gas flows through the calibrated massflow controller 3 (for example, in a case wherein the output voltage is 0.1V, and thus the set voltage corresponding to the flow volume of 500 cc/min is set at 5.1V). In this case, the set voltage correcting unit judges that a drifted voltage of the massflow controller 3 is a difference which is obtained by deducting the reference voltage (e.g., 0.1V) from the output voltage from the massflow controller 3, so as to correct the set voltage by means of the obtained voltage difference.

Figure 6:
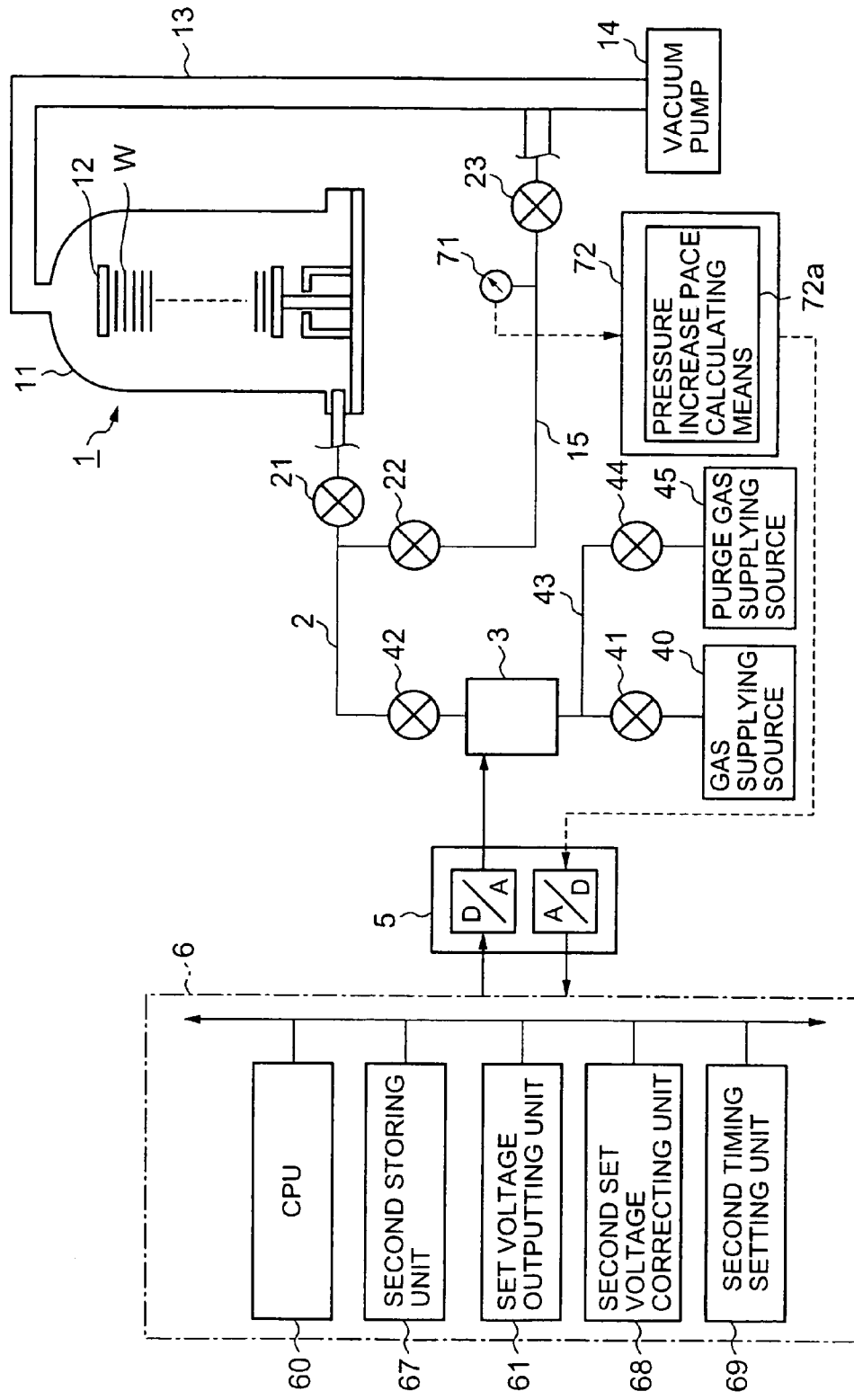
FIG. 6 is a block diagram showing a structure of a semiconductor manufacturing apparatus in another embodiment according to the present invention.

Another embodiment of the present invention is described below, with reference to FIG. 6. In this embodiment, a pressure detecting unit 71 is disposed on a bypass channel 15. Further, a flow volume reference meter 72 is provided, that can calculate a flow volume of a fluid flowing through a gas supplying channel 2 based on a pace of increase of detected pressure values from the pressure detecting unit 71 for a predetermined period of time. In order to save a treatment gas, a purge gas supplying source 45 is connected to the apparatus via a branch channel 43 and a valve such as a shut-off valve 44, so that an inert gas as a purge gas such as a nitrogen gas is supplied to a part between the massflow controller 3 and a shut-off valve 41 on an upstream side thereof.

Herein, the "pace of increase of detected pressure values" means a pressure increase pace that is measured when a part of the gas supplying channel 2 on a downstream side of the shut-off valve 44 and a bypass channel 15 are vacuumed by closing the shut-off valves 44 and 21, a shut-off valve 23 of the bypass channel 15 is then closed, the shut-off valve 44 is opened, and a gas of a predetermined flow volume is allowed to flow by the massflow controller 3. At this moment, the shut-off valve 41 is closed.

A pressure increase pace calculating means 72a is disposed in the flow volume reference meter 72. The pressure increase pace calculating means 72a is adapted to write time-series data of detected pressure values in a work memory, not shown, calculate a pressure increase pace based on the data, and send the value to a controller 6.

The controller 6 includes: a second storing unit 67 that stores the pressure increase pace; a second set voltage correcting unit 68 that corrects a set voltage of the massflow controller 3, based on a reference pressure increase pace (initial value) which is measured upon a calibration of the massflow controller 3, and a pressure increase pace which is measured after the use of the massflow controller 3; and a second timing setting unit 69 that sets a timing at which a pressure increase pace is measured, that is, a timing at which a condition of the massflow controller 3 is checked other than when it is calibrated. The controller 6 also has the constitution shown in FIG. 1, and thus is capable of adjusting the drift of a zero point as described above. However, FIG. 6 shows only parts for compensating a span shift, as a matter of convenience.

It is preferable that a temperature detecting unit is provided, although not shown, that detects temperatures in the gas supplying channel 2 and the bypass channel 15. When a pressure increase pace is calculated, it is possible to compensate an effect caused by a temperature change, by taking into consideration temperatures detected by the temperature detecting unit.

An operation for compensating a span shift of the massflow controller 3 is explained. In this embodiment, a maximum set flow volume of the mass flow controller 3 is 500 cc/min. An output voltage corresponding to the maximum set flow volume is 5V, a detected flow volume and an output voltage of the massflow controller 3 are in a proportional relationship, and there is no drift of a zero point. After the massflow controller 3 which has just been calibrated (for example, new massflow controller 3) is attached on the apparatus, the shut-off valve 44 on the upstream side of the massflow controller 3 and the valve 21 are closed, and the part of the gas supplying channel 2 on a downstream side of the shut-off valve 44 and the bypass channel 15 are vacuumed by a vacuum pump 14. Then, the shut-off valve 23 of the bypass channel 15 is closed. Following thereto, a set voltage is outputted from the set voltage outputting unit 61, in such a manner that a predetermined flow volume (for example, a flow volume of 400 cc, which is 80% the maximum flow volume) is set in the massflow controller 3. Thereafter, the shut-off valve 44 is opened, and a purge gas is allowed to flow by the massflow controller 3.

Figure 7:
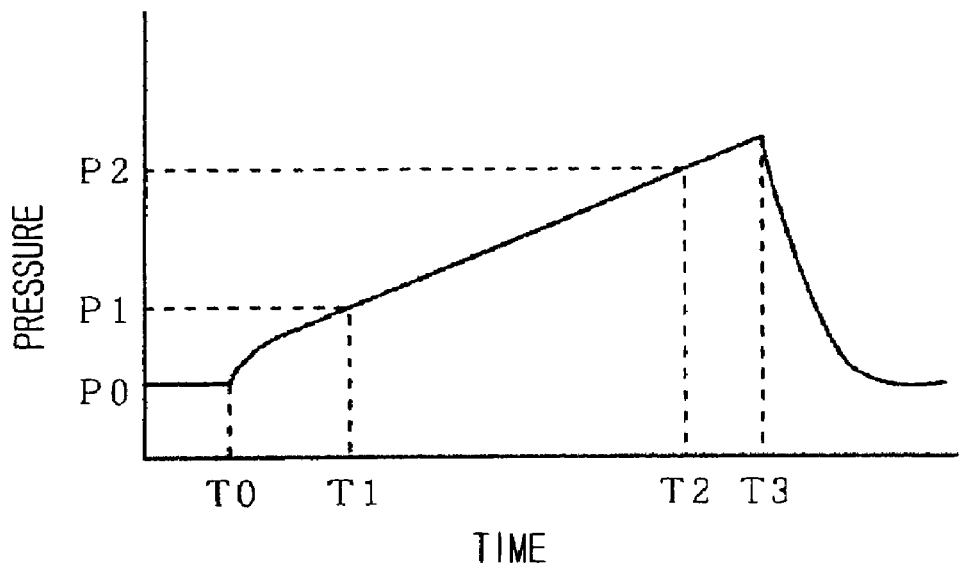
FIG. 7 is a characteristic diagram showing an increase in a pressure value detected by a pressure detecting unit disposed on a bypass channel.

The flow volume reference meter 72 stores time-series data of detected pressure values detected by the pressure detecting unit 71 for a predetermined period of time, calculates a pressure increase pace based on the data, and sends the calculated pressure increase pace to the controller 6. The second storing unit 67 of the controller 6 stores the pressure increase pace as an initial value (reference value). FIG. 7 shows a pressure change during these operations. At the time point T0, the shut-off valve 41 is opened, and at the time point T3, the shut-off valve 23 of the bypass channel 15 is opened. It is preferable that pressure values are detected at a time period for which the pressure stably increases, for example, a time period from the time point T1 to the time point T2.

Then, at each predetermined timing set by the second timing setting unit 69 in the controller 6, for example, whenever a heat treatment is completed which is similar to the above embodiment, a pressure is detected by the pressure detecting unit 71 with the same set flow volume, in the same manner as that for calculating the initial value of the pressure increase pace as described above. Then, a pressure increase pace is calculated by the flow volume reference meter 72, and the calculated pressure increase pace is sent to the second storing unit 67 of the controller 6. The controller 6 compares the pressure increase pace with the initial value which has already been obtained, and corrects the set voltage based on the comparison result.

The above-described method is to directly measure an actual flow volume as a pressure change, by utilizing a capacity of a pipeline on an upstream side of the bypass channel 15, based on a fact that an inflow volume of a gas when it is allowed to flow into the pipeline corresponds to a pressure increase. That is, when a pressure increase pace is accelerated (increased) by 2.5% as compared with an initial value, it means that a flow volume is accelerated by 2.5%. In other words, with the set voltage of 4V corresponding to the set flow volume of 400 cc/min, the flow volume is faster than a programmed flow volume by 2.5%. Therefore, the second set voltage correcting unit 68 in the controller 6 calculates a shift amount by multiplying the 400 cc/min which is the set flow volume of the massflow controller 3 by a factor of 2.5% which is an increased (accelerated) amount of the pressure increase pace <400 cc×2.5% (0.025)=10 cc>. As a result, the shift amount is calculated as 10 cc. By multiplying a value which obtained by dividing the set flow volume (400 cc) by the shift amount (10 cc), by the set voltage (4V) corresponding to the set flow volume<10 cc/400 cc×4V=0.1V>, an output voltage value $\Delta E$ corresponding to the shift amount can be obtained.

Figure 8:
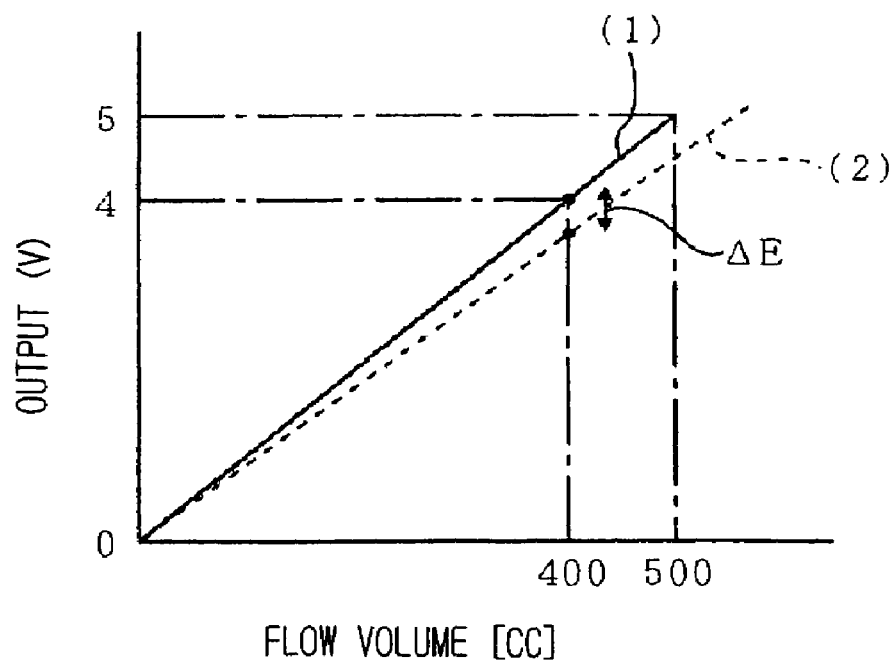
FIG. 8 is a characteristic diagram showing a change of an inclination of a graph indicating a relationship between actual flow volumes and output voltages of the massflow controller.

FIG. 8 shows a shift of a span. The solid line (1) is a graph showing a span (a change in outputs relative to a change in flow volumes) upon calibration, and the dashed line (2) is a graph showing a span which deviates from the span upon calibration. The output voltage value $\Delta E$ of 0.1V which is calculated by the above calculation is deducted from the set voltage of 4.0V corresponding to the set flow volume of 400 cc of the massflow controller 3 (4V−0.1V=3.9V). When a next set flow volume is set at 400 cc, the output voltage value is set at 3.9V. Thus, a flow volume shift at 80% point relative to the maximum flow volume can be corrected. Accordingly, a treatment gas of a set flow volume is supplied into a treatment tube 11 without any flow volume shift, so that substrates can be subjected to a predetermined treatment.

In this embodiment, a case in which the output voltage value is 0V when the gas flow volume is zero is explained. However, in a case wherein the output voltage value is not 0V when the gas flow volume is zero (that is, a zero point is drifted), the set voltage corresponding to the set flow volume of 400 cc is corrected in accordance with the first embodiment. For example, in a case wherein a drift of the output voltage at a zero point is +0.1V, and the set voltage corresponding to the set flow volume of 400 cc is corrected to be 3.9V in accordance with the first embodiment, the set voltage corresponding to the flow volume of 400 cc of the solid line (1) in FIG. 8 is set at 3.9V. At this time, the output voltage value $\Delta E$ corresponding to the shift amount caused by the span shift is calculated by the following equation, i.e., 10 cc/400 cc×3.9V=0.0975V.

In this embodiment, the massflow controller 3 is not adjusted, but the set signal is corrected. Therefore, it is not required for an operator to enter a maintenance room where the massflow controller 3 is installed to adjust the massflow controller 3. Further, it is unnecessary to suspend a product line.

Figure 9:
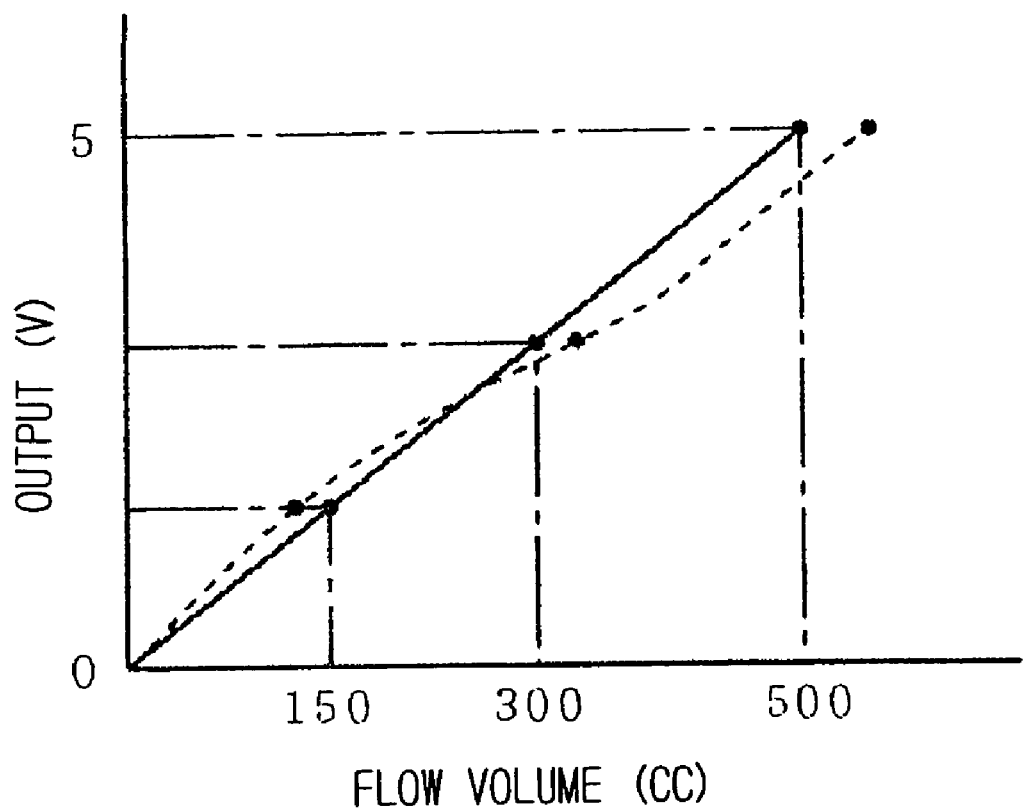
FIG. 9 is a characteristic diagram showing a change of a relationship between actual flow volumes and output voltages of the massflow controller.

In the above massflow controller 3, the set flow volume and the output voltage value are in a proportional relationship. However, when pressure increase paces are calculated at some set flow volumes (for example, at three points such as when the set flow volume is 150 cc, 300 cc, and 500 cc as a maximum flow -volume) by the above method, and the calculated pressure increase paces at the respective flow volumes are different from the respective initial values, it is preferable that the relationship between the flow volume and the output voltage is corrected into, for example, a curve represented by the dashed line in FIG. 9, by means of a program stored in the controller 6. In this case, the set voltage corresponding to the set flow volume is outputted from the set voltage outputting unit 61, based on the curve.

Also in the case wherein the flow volume reference meter 72 is used as described above, when a difference between an initial pressure increase pace and a monitored pressure increase pace exceeds a certain value (for example, a shift amount of an output voltage which is converted from a difference between pressure increase paces exceeds a threshold value), it is possible to raise an alarm to inform an operator of the unusual situation.

After the set voltage is corrected by means of the pressure increase pace as described above (after the set voltage 4V is corrected into 3.9V), a flow volume of the massflow controller 3 may be set based on the set voltage to calculate a change amount of the pressure increase pace relative to the reference value, and the same loop (step of correcting the set voltage by calculating the pressure increase pace) can be repeated until the change amount falls within a predetermined value (e.g., 1.0%).

As described above, the span shift is compensated based on the pressure increase pace. However, in place of the pressure increase pace, a pressure decrease pace may be used. In this case, the shut-off valve 44 on an upstream side of the massflow controller 3 is opened, the shut-off valve 21 is closed, and the shut-off valves 42, 22, and 23 are opened. That is, a purge gas is discharged from the bypass channel 15 through the massflow controller 3. Then, the massflow controller 3 is set at a predetermined flow volume. Under this state, the shut-off valve 44 is closed to stop a supply of the purge gas, and a pressure decrease pace for a predetermined period of time is calculated based on time-series data of pressure values detected by the pressure detecting unit 71. The pressure decrease pace can be utilized in the same manner as that of the above-described pressure increase pace.

In place of the purge gas, a treatment gas may be allowed to flow by opening the shut-off valve 41. Not limited to a case wherein a gas flows through the massflow controller 3, the present invention can be applied to a case wherein a liquid such as an organic chemical liquid source flowing through the massflow controller 3 is evaporated by an evaporator on a downstream side of the massflow controller 3 and is supplied into a reaction vessel. In addition, the present invention can be applied when a flow volume of an application liquid such as a resist liquid or any other liquid is adjusted by a massflow controller, in order to apply the application liquid on a substrate.

The invention claimed is:

1. A semiconductor manufacturing apparatus, comprising:
   a treating unit that treats a substrate to manufacture thereon a semiconductor device;
   a fluid supplying channel for supplying a fluid required for a treatment of the substrate to the treating unit;
   a set voltage outputting unit that outputs a set voltage corresponding to a set flow volume of the fluid;
   a massflow controller disposed on the fluid supplying channel, that controls a flow volume of the fluid based on the set voltage;
   a first shut-off valve disposed on the fluid supplying channel on an upstream side of the massflow controller; and
   a second shut-off valve disposed on the fluid supplying channel on a downstream side of the massflow controller; wherein the massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal;

a storing unit is provided, that stores the detected voltage outputted from the detecting unit of the massflow controller, when the first and the second shut-off valves are closed; and a set voltage correcting unit is provided, that corrects the set voltage based on the detected voltage stored in the storing unit, in such a manner that a drift of the detected voltage is compensated when an actual flow volume of the fluid is zero.

2. The semiconductor manufacturing apparatus according to claim 1, further comprising:

a timing setting means that sets a timing at which the first and the second shut-off valves are closed, and the storing unit stores the detected voltage outputted from the detecting unit of the massflow controller.

3. The semiconductor manufacturing apparatus according to claim 1, further comprising:

an alarm raising means that raises an alarm when the detected voltage deviates over a predetermined threshold value.

4. A semiconductor manufacturing apparatus, comprising:

a treating unit that treats a substrate under a predetermined vacuum atmosphere to manufacture a semiconductor device on the substrate;

a vacuum discharging channel connected to the treating unit;

a fluid supplying channel for supplying a fluid required for a treatment of the substrate to the treating unit;

a set voltage outputting unit that outputs a set voltage corresponding to a set flow volume of the fluid;

a massflow controller disposed on the fluid supplying channel, that controls a flow volume of the fluid based on the set voltage;

a bypass channel that diverges from the fluid supplying channel and bypasses the treating unit to reach the vacuum discharging channel;

a pressure detecting unit and a third shut-off valve that are disposed on the bypass channel in this order from an upstream side thereof; and a set voltage correcting unit that corrects the set voltage based on a comparison between: a pace of increase of detected pressure values detected by the pressure detecting unit for a predetermined period of time, the detected pressure values being detected when, at a predetermined timing, the bypass channel is vacuumed, the third shut-off valve is then closed, and the massflow controller is set at a predetermined flow volume to supply the fluid to the bypass channel through the fluid supplying channel; and a reference pace of increase of detected pressure values detected by the pressure detecting unit for a predetermined period of time, the detected pressure values being detected when the bypass channel is vacuumed, the third shut-off valve is then closed, and the massflow controller calibrated in a reference state is set at a predetermined flow volume to supply the fluid to the bypass channel through the fluid supplying channel.

5. The semiconductor manufacturing apparatus according to claim 4, wherein the massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal; and the set voltage correcting unit corrects the set voltage in such a manner that a span shift of the detected voltage is compensated.

6. The semiconductor manufacturing apparatus according to claim 4, wherein the set voltage correcting unit corrects the set voltage based on a comparison between: a plurality of paces of increase obtained when the massflow controller is set at a plurality of predetermined flow volumes; and a plurality of reference paces of increase obtained when the massflow controller calibrated in a reference state is set at a plurality of predetermined flow volumes.

7. A semiconductor manufacturing apparatus, comprising:

a treating unit that treats a substrate under a predetermined vacuum atmosphere to manufacture a semiconductor device on the substrate;

a vacuum discharging channel connected to the treating unit;

a fluid supplying channel for supplying a fluid required for a treatment of the substrate to the treating unit;

a set voltage outputting unit that outputs a set voltage corresponding to a set flow volume of the fluid;

a massflow controller disposed on the fluid supplying channel, that controls a flow volume of the fluid based on the set voltage;

a bypass channel that diverges from the fluid supplying channel and bypasses the treating unit to reach the vacuum discharging channel;

a first shut-off valve disposed on the fluid supplying channel on an upstream side of the massflow controller; and a pressure detecting unit disposed on the bypass channel; and a set voltage correcting unit that corrects the set voltage based on a comparison between: a pace of decrease of detected pressure values detected by the pressure detecting unit for a predetermined period of time, the detected pressure values being detected when the first shut-off valve is closed under a condition wherein, at a predetermined timing, the massflow controller is set at a predetermined flow volume to supply the fluid to the bypass channel through the fluid supplying channel while the bypass channel is vacuumed; and a reference pace of decrease of detected pressure values detected by the pressure detecting unit for a predetermined period of time, the detected pressure values being detected when the first shut-off valve is closed under a condition wherein the massflow controller calibrated in a reference state is set at a predetermined flow volume to supply the fluid to the bypass channel through the fluid supplying channel while the bypass channel is vacuumed.

8. The semiconductor manufacturing apparatus according to claim 7, wherein the massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal; and the set voltage correcting unit corrects the set voltage in such a manner that a span shift of the detected voltage is compensated.

9. The semiconductor manufacturing apparatus according to claim 7, wherein
the set voltage correcting unit corrects the set voltage based on a comparison between: a plurality of paces of decrease obtained when the massflow controller is set at a plurality of predetermined flow volumes; and a plurality of reference paces of decrease obtained when the massflow controller calibrated in a reference state is set at a plurality of predetermined flow volumes.

10. A semiconductor manufacturing method performed by a semiconductor manufacturing apparatus including: a treating unit that treats a substrate to manufacture thereon a semiconductor device; a fluid supplying channel for supplying a fluid required for a treatment of the substrate to the treating unit; a set voltage outputting unit that outputs a set voltage corresponding to a set flow volume of the fluid; a massflow controller disposed on the fluid supplying channel, that controls a flow volume of the fluid based on the set voltage; a first shut-off valve disposed on the fluid supplying channel on an upstream side of the massflow controller; and a second shut-off valve disposed on the fluid supplying channel on a downstream side of the massflow controller; wherein the massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal; a storing unit is provided, that stores the detected voltage outputted from the detecting unit of the massflow controller, when the first and the second shut-off valves are closed; and a set voltage correcting unit is provided, that corrects the set voltage based on the detected voltage stored in the storing unit, in such a manner that a drift of the detected voltage is compensated when an actual flow volume of the fluid is zero; the semiconductor manufacturing method comprising the steps of:
closing the first and the second shut-off valves;
causing the storing unit to store the detected voltage outputted from the detecting unit of the massflow controller, when the first and the second shut-off valves are closed; and
causing the set voltage correcting unit to correct the set voltage based on the detected voltage stored in the storing unit, in such a manner that a drift of the detected voltage is compensated when an actual flow volume of the fluid is zero.

11. The semiconductor manufacturing method according to claim 10, further comprising the step of:
raising an alarm when the detected voltage deviates over a predetermined threshold value.

12. A semiconductor manufacturing method performed by a semiconductor manufacturing apparatus including: a treating unit that treats a substrate under a predetermined vacuum atmosphere to manufacture a semiconductor device on the substrate; a vacuum discharging channel connected to the treating unit; a fluid supplying channel for supplying a fluid required for a treatment of the substrate to the treating unit; a set voltage outputting unit that outputs a set voltage corresponding to a set flow volume of the fluid; a massflow controller disposed on the fluid supplying channel, that controls a flow volume of the fluid based on the set voltage; a bypass channel that diverges from the fluid supplying channel and bypasses the treating unit to reach the vacuum discharging channel; a pressure detecting unit and a third shut-off valve that are disposed on the bypass channel in this order from an upstream side thereof; and a set voltage correcting unit that corrects the set voltage based on a comparison between: a pace of increase of detected pressure values detected by the pressure detecting unit for a predetermined period of time, the detected pressure values being detected when, at a predetermined timing, the bypass channel is vacuumed, the third shut-off valve is then closed, and the massflow controller is set at a predetermined flow volume to supply the fluid to the bypass channel through the fluid supplying channel; and a reference pace of increase of detected pressure values detected by the pressure detecting unit for a predetermined period of time, the detected pressure values being detected when the bypass channel is vacuumed, the third shut-off valve is then closed, and the massflow controller calibrated in a reference state is set at a predetermined flow volume to supply the fluid to the bypass channel through the fluid supplying channel; the semiconductor manufacturing method comprising the steps of:
calculating a reference pace of increase of detected pressure values detected by the pressure detecting unit for a predetermined period of time, when the bypass channel is vacuumed, the third shut-off valve is then closed, and the massflow controller calibrated in a reference state is set at a predetermined flow volume to supply the fluid to the bypass channel through the fluid supplying channel;
calculating a pace of increase of detected pressure values detected by the pressure detecting unit for a predetermined period of time, when, at a predetermined timing, the bypass channel is vacuumed, the third shut-off valve is then closed, and the massflow controller is set at a predetermined flow volume to supply the fluid to the bypass channel through the fluid supplying channel; and
correcting the set voltage based on the comparison between the reference pace of increase and the pace of increase.

13. The semiconductor manufacturing method according to claim 12, wherein
the massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal; and
the step of correcting the set voltage is carried out in such a manner that a span shift of the detected voltage is compensated.

14. The semiconductor manufacturing method according to claim 12, wherein
the step of correcting the set voltage is carried out based on a comparison between: a plurality of paces of increase obtained when the massflow controller is set at a plurality of predetermined flow volumes; and a plurality of reference paces of increase obtained when the massflow controller calibrated in a reference state is set at a plurality of predetermined flow volumes.

15. A semiconductor manufacturing method performed by a semiconductor manufacturing apparatus including: a treating unit that treats a substrate under a predetermined vacuum atmosphere to manufacture a semiconductor device on the substrate; a vacuum discharging channel connected to the treating unit; a fluid supplying channel for supplying a fluid required for a treatment of the substrate to the treating unit; a set voltage outputting unit that outputs a set voltage corresponding to a set flow volume of the fluid; a massflow controller disposed on the fluid supplying channel, that controls a flow volume of the fluid based on the set voltage; a bypass channel that diverges from the fluid supplying channel and bypasses the treating unit to reach the vacuum discharging channel; a first shut-off valve disposed on the fluid supplying channel on an upstream side of the massflow controller; and a pressure detecting unit disposed on the bypass channel; and a set voltage correcting unit that corrects the set voltage based on a comparison between: a pace of decrease of detected pressure values detected by the pressure detecting unit for a predetermined period of time, the detected pressure values being detected when the first shut-off valve is closed under a condition wherein, at a predetermined timing, the massflow controller is set at a predetermined flow volume to supply the fluid to the bypass channel through the fluid supplying channel while the bypass channel is vacuumed; and a reference pace of decrease of detected pressure values detected by the pressure detecting unit for a predetermined period of time, the detected pressure values being detected when the first shut-off valve is closed under a condition wherein the massflow controller calibrated in a reference state is set at a predetermined flow volume to supply the fluid to the bypass channel through the fluid supplying channel while the bypass channel is vacuumed; the semiconductor manufacturing method comprising the steps of:

calculating a reference pace of decrease of detected pressure values detected by the pressure detecting unit for a predetermined period of time, when the first shut-off valve is closed under a condition wherein the massflow controller calibrated in a reference state is set at a predetermined flow volume to supply the fluid to the bypass channel through the fluid supplying channel while the bypass channel is vacuumed;

calculating a pace of decrease of detected pressure values detected by the pressure detecting unit for a predetermined period of time, when the first shut-off valve is closed under a condition wherein, at a predetermined timing, the massflow controller is set at a predetermined flow volume to supply the fluid to the bypass channel through the fluid supplying channel while the bypass channel is vacuumed; and correcting the set voltage based on the comparison between the reference pace of decrease and the pace of decrease.

16. The semiconductor manufacturing method according to claim 15, wherein the massflow controller includes: a detecting unit that detects an actual flow volume of the fluid and outputs a corresponding detected voltage; a comparing unit that compares the set voltage with the detected voltage to output an operation signal; and a flow volume adjusting unit that adjusts the flow volume of the fluid based on the operation signal; and the step of correcting the set voltage is carried out in such a manner that a span shift of the detected voltage is compensated.

17. The semiconductor manufacturing method according to claim 15, wherein the step of correcting the set voltage is carried out based on a comparison between: a plurality of paces of decrease obtained when the massflow controller is set at a plurality of predetermined flow volumes; and a plurality of reference paces of decrease obtained when the massflow controller calibrated in a reference state is set at a plurality of predetermined flow volumes.

18. The semiconductor manufacturing apparatus according to claim 2, further comprising:

an alarm raising means that raises an alarm when the detected voltage deviates over a predetermined threshold value.

* * * * *